(12) United States Patent
Brasher

(10) Patent No.: US 12,403,932 B2
(45) Date of Patent: Sep. 2, 2025

(54) AUTONOMOUS VEHICLE NAVIGATION OF BYPASS MERGE LANES

(71) Applicant: Robert C. Brasher, Fremont, CA (US)

(72) Inventor: Robert C. Brasher, Fremont, CA (US)

( * ) Notice: Subject to any disclaimer, the term of this patent is extended or adjusted under 35 U.S.C. 154(b) by 653 days.

(21) Appl. No.: 17/863,262

(22) Filed: Jul. 12, 2022

(65) Prior Publication Data
US 2023/0166760 A1 Jun. 1, 2023

Related U.S. Application Data

(63) Continuation-in-part of application No. 15/428,588, filed on Feb. 9, 2017, now Pat. No. 11,386,815.

(60) Provisional application No. 62/352,987, filed on Jun. 21, 2016.

(51) Int. Cl.
*B60W 60/00* (2020.01)
*B60W 30/18* (2012.01)
*G06V 20/13* (2022.01)
*G06V 20/56* (2022.01)
*G08G 1/01* (2006.01)
*G08G 1/04* (2006.01)
*G08G 1/09* (2006.01)

(52) U.S. Cl.
CPC .... *B60W 60/001* (2020.02); *B60W 30/18163* (2013.01); *G06V 20/13* (2022.01); *G06V 20/588* (2022.01); *G08G 1/0145* (2013.01); *G08G 1/04* (2013.01); *G08G 1/091* (2013.01); *B60W 2420/403* (2013.01); *B60W 2552/53* (2020.02)

(58) Field of Classification Search
CPC ......... B60W 60/001; B60W 2420/403; B60W 2552/53; G06V 20/13; G06V 20/588; G08G 1/0145; G08G 1/04; G08G 1/091
USPC ............................................ 404/9, 84.05, 94
See application file for complete search history.

(56) References Cited

U.S. PATENT DOCUMENTS

| | | | | |
|---|---|---|---|---|
| 4,690,583 A * | 9/1987 | Faulconer | ............... | E01F 13/08 404/6 |
| 5,006,010 A * | 4/1991 | Duckett | .................. | E01F 9/553 404/9 |
| 5,289,183 A * | 2/1994 | Hassett | ................ | G07B 15/063 340/928 |
| 5,470,171 A * | 11/1995 | Tseng | ....................... | E01F 9/594 404/16 |
| 5,917,432 A * | 6/1999 | Rathbone | .................. | G08G 1/07 340/917 |
| 6,276,542 B1 * | 8/2001 | McCrary | ................. | B61B 15/00 213/9 |
| 6,694,247 B2 * | 2/2004 | Hameleers | ............... | G08G 1/09 340/907 |

(Continued)

FOREIGN PATENT DOCUMENTS

WO WO-2019220319 A1 * 11/2019 .......... B60W 30/182

*Primary Examiner* — Raymond W Addie
(74) *Attorney, Agent, or Firm* — William C. Milks, III

(57) ABSTRACT

A system to improve the management of through traffic including an autonomous vehicle and other vehicles entering and exiting a multilane roadway. The lanes are separated by at least one lane separator which should not be crossed by traffic along a designated portion of the roadway, such as within a predetermined distance from a roadway entrance or exit. The at least one lane separator may be any lane marking, barrier, or the like. The at least one lane separator can be any length and located at any relative position with respect to the lanes.

20 Claims, 9 Drawing Sheets

(56) References Cited

U.S. PATENT DOCUMENTS

| | | | |
|---|---|---|---|
| 7,021,857 B2* | 4/2006 | Van Der Poel | E01F 9/30 404/9 |
| 9,224,053 B1* | 12/2015 | Ferguson | G06V 20/588 |
| 9,310,804 B1* | 4/2016 | Ferguson | G05D 1/0246 |
| 9,418,546 B1* | 8/2016 | Whiting | G08G 1/0133 |
| 9,719,801 B1* | 8/2017 | Ferguson | G01C 21/3602 |
| 9,898,846 B1* | 2/2018 | Borras | G06V 20/54 |
| 10,253,468 B1* | 4/2019 | Linville | E01F 9/559 |
| 2003/0060969 A1* | 3/2003 | Waite | G08G 1/0104 701/117 |
| 2004/0091313 A1* | 5/2004 | Zhou | E01C 1/002 404/1 |
| 2017/0261327 A1* | 9/2017 | Olsson | G01C 21/005 |
| 2018/0186371 A1* | 7/2018 | Sterniak | B62D 5/04 |
| 2018/0328752 A1* | 11/2018 | Tomatsu | G06T 19/006 |
| 2019/0266418 A1* | 8/2019 | Xu | G06V 10/46 |
| 2019/0266419 A1* | 8/2019 | Schack | G05D 1/0246 |
| 2019/0347492 A1* | 11/2019 | Morimura | B60W 60/001 |
| 2021/0039669 A1* | 2/2021 | Watson | G06V 20/588 |
| 2024/0318963 A1* | 9/2024 | Keidel | G06V 10/98 |
| 2025/0076070 A1* | 3/2025 | Lin | G01C 21/3658 |
| 2025/0118084 A1* | 4/2025 | Lukarski | G06V 10/82 |

* cited by examiner

BROKAW 1ST ST     4TH ST     I-880     OAKLAND ROAD

SAN TOMAS EXPRESSWAY     TRIMBLE DE LA CRUZ     SR 87     BROKAW 1ST ST

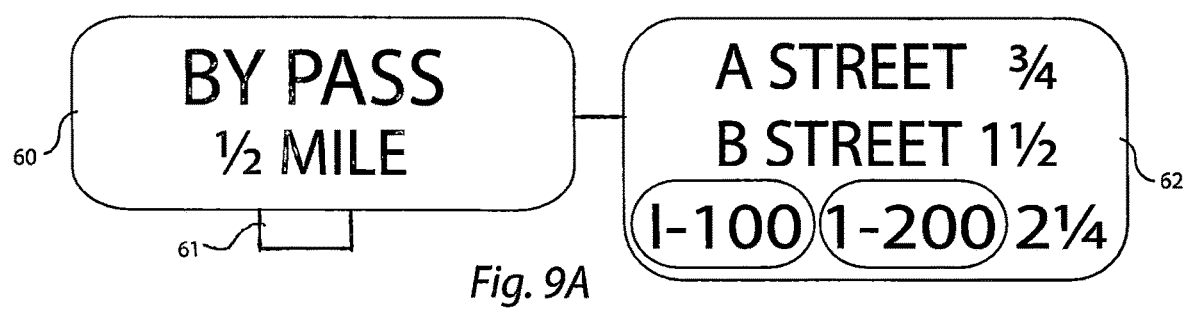
Fig. 9A
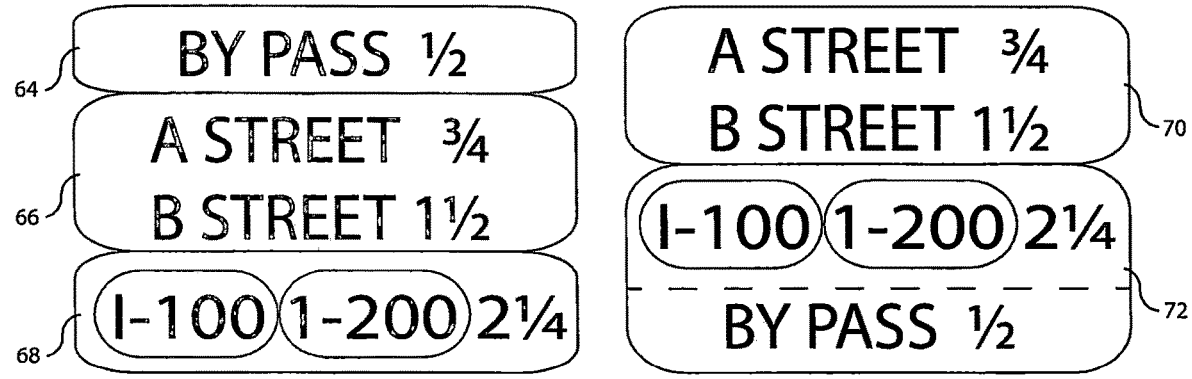
Fig. 9B
Fig. 9C

AUTONOMOUS VEHICLE NAVIGATION OF BYPASS MERGE LANES

CROSS-REFERENCE TO RELATED PATENT APPLICATIONS

This application is a continuation-in-part and claims the benefit of U.S. patent application Ser. No. 15/428,588 filed on Feb. 9, 2017 entitled BYPASS MERGE LANES, which claims the benefit of U.S. Provisional Patent Application No. 62/352,987 filed on Jun. 21, 2016, entitled BYPASS MERGE LANES, the disclosures of which are hereby incorporated herein in their entirety by this reference.

BACKGROUND OF THE INVENTION

1. Field of the Invention

The present invention relates to the field of vehicular traffic management. Generally, the present invention relates to management of through traffic in the presence of vehicles entering and exiting a roadway to alleviate traffic congestion.

2. Description of the Prior Art

Roadways such as freeways and highways typically have multiple lanes of traffic traveling in each direction. At certain locations along a multilane roadway, entrances and exits are provided to allow vehicles to enter and exit the roadway. Often other vehicles are traveling on the roadway, and vehicles entering the roadway must safely merge into traffic while vehicles exiting the roadway must safely maneuver to exit the roadway.

Through traffic is often impeded due to traffic congestion in the vicinity of an entrance or exit of the roadway. Furthermore, vehicles entering the roadway into traffic can present a safety risk for both through traffic and the vehicles exiting the roadway. Also, vehicles exiting the roadway present a safety risk for both through traffic and vehicles entering the roadway. The risk is increased by motorists in vehicles changing lanes in the vicinity of an entrance or exit to avoid congested traffic.

With the advent of technology to implement autonomous vehicles and the anticipated deployment of such vehicles, the problem of traffic being impeded due to traffic congestion in the vicinity of an entrance or exit of the roadway raises new concerns. The objective of the present invention addresses the navigation of autonomous vehicles through locations in the vicinity of an entrance or exit of the roadway having bypass merge lanes to safely alleviate traffic congestion.

SUMMARY OF THE INVENTION

The present invention has as an object to provide a system to improve the management of through traffic in the vicinity of an entrance or exit where vehicles enter or exit a multilane roadway wherein one or more of the vehicles is an autonomous vehicle. Various examples of the system in accordance with the present invention manage vehicular traffic on a roadway with multiple lanes in at least one direction. The lanes are separated by one or more lane separators which should not be crossed by through traffic or vehicles entering or exiting the roadway along a designated portion of the roadway, such as within a predetermined distance from an entrance or exit provided for vehicles to enter or exit the roadway. The lane separators may be any lane marking, barrier, or the like. The lane separators may be any length and located at any designated relative positions with respect to the lanes. Additionally, signage is preferably provided to alert motorists of upcoming lane separators for managing traffic proximate an entrance or exit.

In accordance with one aspect of the present invention, data is acquired for the positions of the lane separators. By way of example, the lane separator data may be acquired by an autonomous vehicle, such as, by means of a camera mounted on the autonomous vehicle, when the vehicle encounters a location of the roadway having lane separators. In accordance with another example of the present invention, the data for the positions of the lane separators may be acquired by means of Global Positioning System (GPS) satellite images. In accordance with yet another example of the present invention, the data for the positions of the lane separators may be provided by the transportation authority which implements the lane separators.

In accordance with the examples, the data for the positions of the lane separators are preferably stored in a database. An autonomous vehicle is provided with access to the database to download the data. The downloaded data is utilized by the autonomous vehicle to navigate the lane separators based on the downloaded data.

In one preferred example, after the positions of the lane separators have been acquired, the data for the positions of the lane separators are stored in a lookup table in a database. A transmitter is mounted on the signage to transmit an identification of the upcoming location of the lane separators as the autonomous vehicle approaches the location. The autonomous vehicle is equipped with a transponder to receive the transmitted identification and transmits the identification to the lookup table which is used to look up the locations of the lane separators and download the data for the lane separators to the autonomous vehicle. The autonomous vehicle then utilizes the data for the lane separators to navigate the upcoming lane separators.

BRIEF DESCRIPTION OF THE DRAWING

The various examples of the present invention will be described in conjunction with the accompanying figures of the drawing to facilitate an understanding of the preset invention. In the drawing:

FIG. 9, comprising FIGS. 9A to 9C, illustrates examples of signage to alert motorists to upcoming designated traffic management portions of a roadway in accordance with the present invention;

DETAILED DESCRIPTION OF THE PREFERRED EXAMPLES

Figure 1:
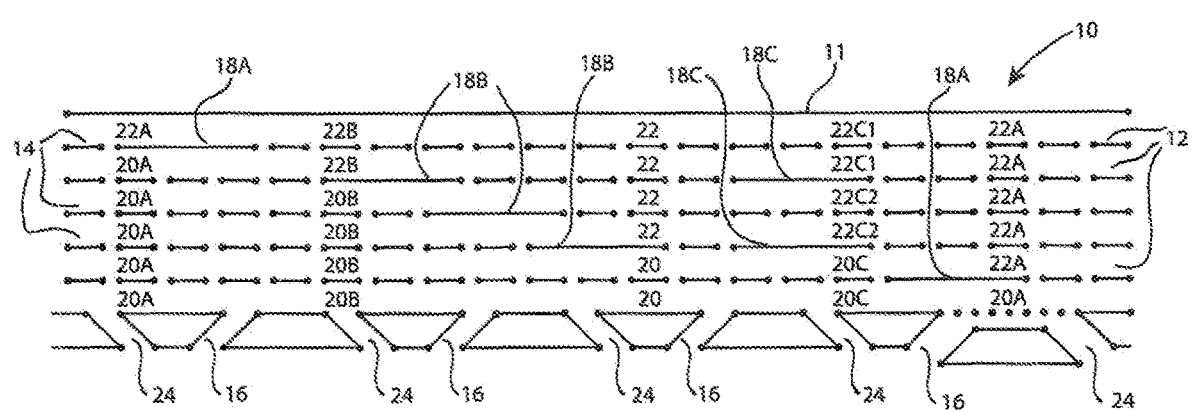
FIG. 1 is an elevational view of a multilane roadway for management of vehicular traffic at one or more entrances and exits to a roadway in accordance with an example of the present invention.

An example of a multilane roadway management system 10 in accordance with the present invention is shown in FIG. 1. A roadway 11 comprises a plurality of lanes 12 in one direction, for example, six lanes, as shown in FIG. 1. The lanes 12 are preferably marked by lane marking 14 to define each of the lanes, for example, by conventional striping in the form of dashed line segments to designate the lanes.

As shown in FIG. 1, one or more entrances 16 are provided to allow vehicles to enter the roadway 11. In accordance with the example of the present invention shown in FIG. 1, one or more lane separators 18 is provided to divide the roadway 11 into one or more merge lanes 20 and one or more bypass lanes 22 proximate to the one or more entrances 16 or exits 24. The one or more lane separators 18 should not be crossed by through traffic or merging or exiting vehicles along the portion of the roadway where the lane separator(s) is/are present. The one or more lane separators 18 may be any lane marking, barrier, or the like. The one or more lane separators 18 may be any length and located at any position relative to the lanes 12. As shown in FIG. 1, for example, the one or more lane separators 18 may be a lane marking consisting of a solid line of striping distinguishable from the dashed line segments 14 of striping that define the lanes 12.

The multilane roadway management system 10 provides one or more lane separators 18 which vehicles should not cross between the bypass lanes 22 designated for through traffic and the merge lanes 20 to reduce traffic congestion and to improve the safety of the roadway 11 for both through traffic and vehicles entering and exiting the roadway at the entrances 16 and exits 24. The merge lanes 20 are those lanes proximal to an entrance 16 (i.e., closer to an entrance) or exit 24 (i.e., closer to an exit) for vehicles entering or exiting the roadway 11, respectively. The bypass lanes 22 are those lanes distal from the entrance 16 (i.e., farther from the entrance) or exit 24 (i.e., farther from the exit) on the other side of the merge lanes 20 for through traffic on the roadway 11.

As shown in FIG. 1, in accordance with one example of the present invention, one or more lane separators 18A may be provided to separate the lanes 12 into merge lanes 20A and bypass lanes 22A at one or more predetermined locations along the roadway 11. In accordance with another example, lane separators 18B may partially overlap to alter the number of merge lanes 20B and bypass lanes 22B at one or more other predetermined locations along the roadway 11. In accordance with a further example, lane separators 18C may entirely overlap at one or more predetermined locations along the roadway 11 to manage through traffic into merge lanes 20C and bypass lanes 22C, with the lane separators 18C establishing multiple corridors (e.g., two corridors) of bypass lanes 22C1 and 22C2.

If there is an exit 24 in proximity to one or more of the entrances 16, the multilane roadway management system 10 preferably provides appropriate roadway signage to alert motorists approaching the exit that they need to maneuver their vehicles into the merge lanes 20 and be prepared to exercise caution, including reducing their speed, to safely allow vehicles entering the roadway to merge into traffic at the entrance(s) 16 while allowing vehicles exiting the roadway to safely exit without impeding through traffic.

Figure 2:
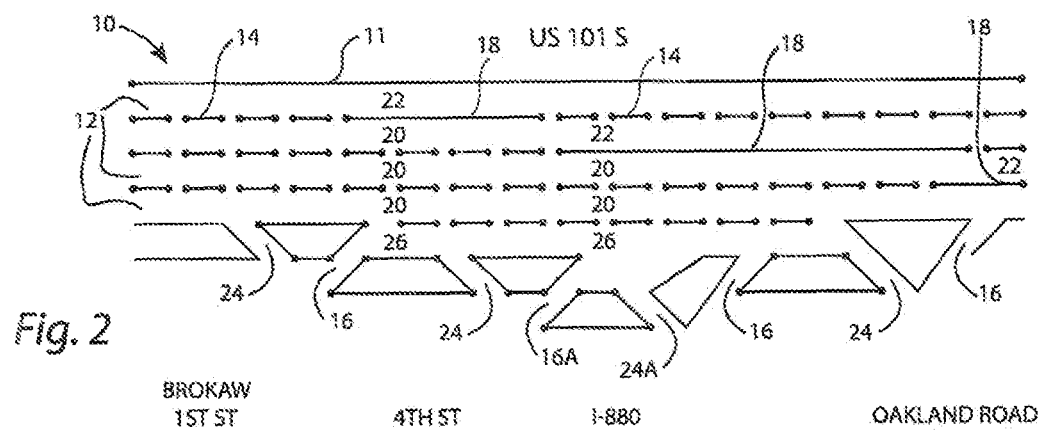
FIG. 2 is an elevational view of another example of a multilane roadway for management of vehicular traffic at one or more entrances and exits to a roadway in accordance with the present invention.

Referring to FIG. 2, an example of the multilane roadway management system 10 is shown where multiple entrances 16 and exits 24 are spaced along the roadway 11. As shown in FIG. 2, lane separators 18 having various lengths divide the roadway 11 into merge lanes 20 and bypass lanes 22 in the vicinity of the entrances 16 and exits 24. The bypass lanes 22 begin where the conventional striping in the form of dashed line segments 14 to define the lanes 12 of the multilane roadway 11 transitions to lane marking consisting of a solid line, for example. The positioning of the lane separators 18 is determined by the spacing of the entrances 16 to allow vehicles entering the roadway 11 to safely merge into through traffic while accommodating vehicles entering the roadway at a subsequent entrance 16 to merge onto the roadway after initially entering an additional entrance/exit lane 26. In instances where an entrance such as entrance 16A is in close proximity to an exit such as exit 24A, the number of merge lanes 20 is sufficient to allow entering and exiting vehicles to safely enter and exit the roadway 11 with minimal effect on through traffic which is restricted to bypass lanes 22.

Figure 3:
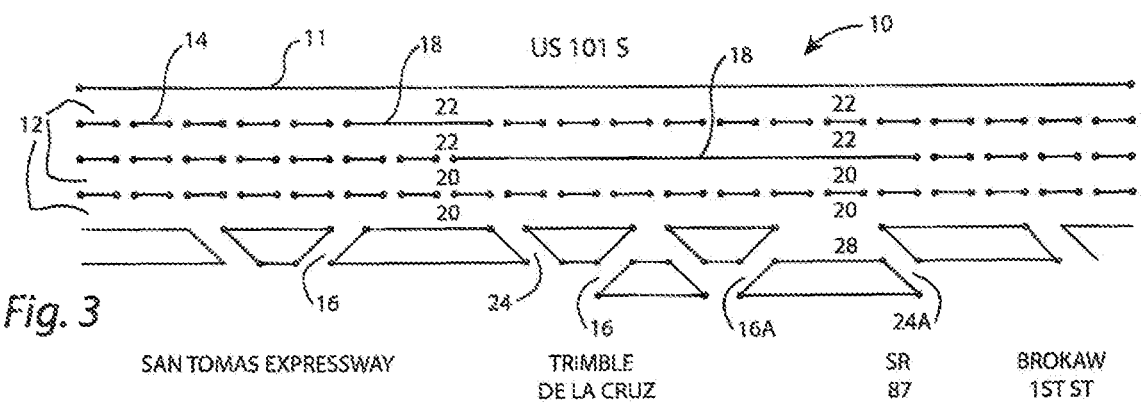
FIG. 3 is an elevational view of an additional example of a multilane roadway for management of vehicular traffic at one or more entrances and exits to a roadway in accordance with the present invention.

Referring to FIG. 3, an example of the multilane roadway management system 10 is shown where multiple entrances 16 and exits 24 are spaced along the roadway 11. As shown in FIG. 3, lane separators 18 having various lengths divide the roadway 11 into merge lanes 20 and bypass lanes 22 in the vicinity of the entrances 16 and exits 24. The bypass lanes 22 begin where the conventional striping in the form of dashed line segments 14 to define the lanes 12 of the multilane roadway 11 transitions to lane marking consisting of a solid line, for example. The positioning of the lane separators 18 is determined by the spacing of the entrances 16 to allow vehicles entering the roadway 11 to safely merge into through traffic while accommodating vehicles entering the roadway at a subsequent entrance 16 to safely merge onto the roadway after initially entering an additional entrance/exit lane 28. In instances where an entrance such as entrance 16A is in close proximity to an exit such as exit 24A, the number of merge lanes 20 is sufficient to allow entering and exiting vehicles to enter and exit the roadway 11 with minimal effect on through traffic which is restricted to bypass lanes 22.

Figure 4:
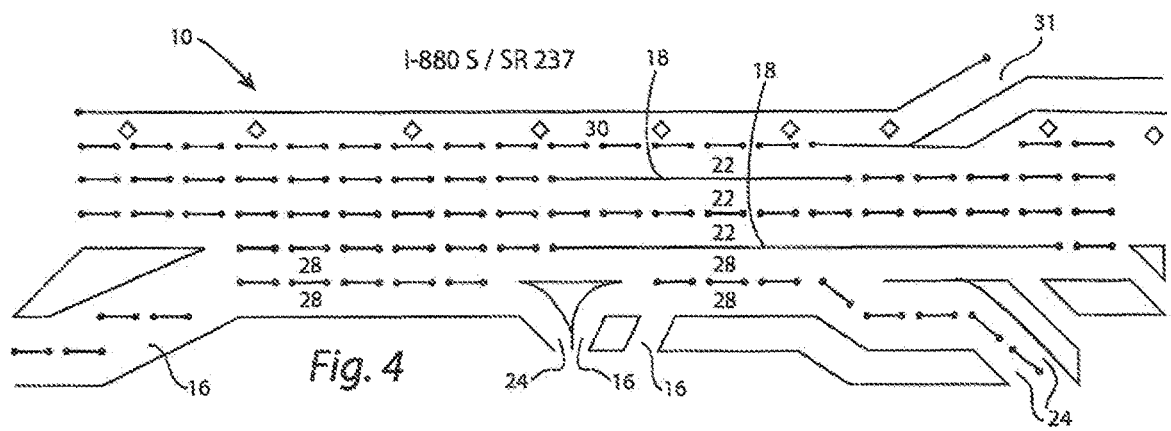
FIG. 4 is an elevational view of a further example of a multilane roadway for management of vehicular traffic at one or more entrances and exits to a roadway in accordance with the present invention.

Referring to FIG. 4, an example of the multilane roadway management system 10 is shown where multiple entrances 16 and exits 24 are spaced along the roadway 11 and a diamond lane 30 is also present to allow vehicles to exit the roadway at a flyover 31 or continue on in the diamond lane. As shown in FIG. 4, lane separators 18 having various lengths divide the roadway 11 into merge lanes 20 and bypass lanes 22 including the diamond lane 30 in the vicinity of the entrances 16 and exits 24. The bypass lanes 22 begin where the conventional striping in the form of dashed line segments 14 to define the lanes 12 of the multilane roadway 11 transitions to lane marking consisting of a solid line, for example. The positioning of the lane separators 18 is determined by the spacing of the entrances 16 to allow vehicles entering the roadway 11 to safely merge into through traffic while accommodating vehicles entering the roadway at a subsequent entrance 16 to safely merge onto the roadway after initially entering additional entrance/exit lanes 28. In instances where the entrances 16 are in close proximity to the exits 24, the number of merge lanes 20 is sufficient to allow entering and exiting vehicles to safely enter and exit the roadway 11 after first entering the additional entrance/exit lanes 28 with minimal effect on through traffic which is restricted to bypass lanes 22.

Figure 5:
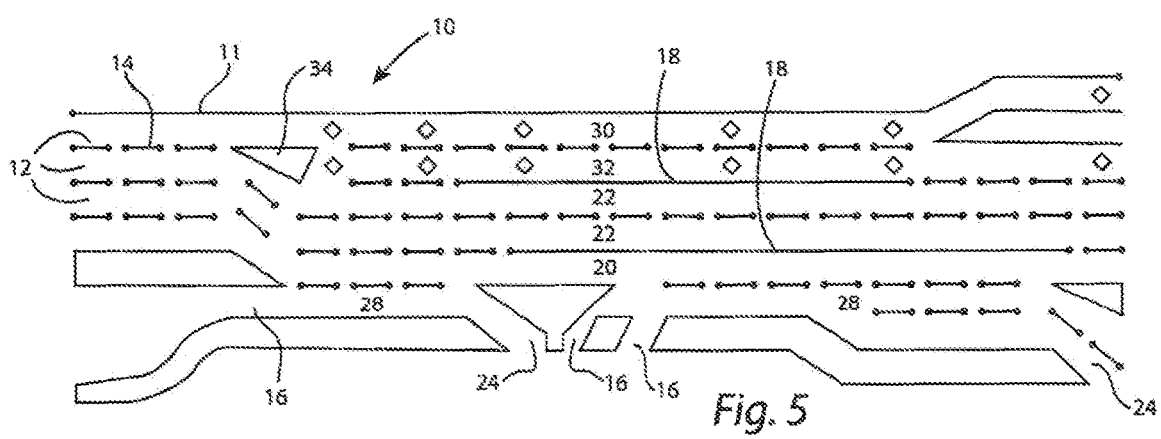
FIG. 5 is an elevational view of an alternative example of the multilane roadway for management of vehicular traffic at one or more entrances and exits to the roadway shown in FIG. 4.

Referring to FIG. 5, an example of the multilane roadway management system 10 is shown where multiple entrances 16 and exits 24 are spaced along the roadway 11 and a diamond lane 30 is also present to allow vehicles to exit the roadway. Furthermore, a diamond lane 32 is established by a roadway marking 34 for through traffic on the roadway 11. As shown in FIG. 5, lane separators 18 having various lengths divide the roadway 11 into merge lanes 20 and bypass lanes 22 including the diamond lanes 30 and 32 in the vicinity of the entrances 16 and exits 24. The bypass lanes 22 begin where the conventional striping in the form of dashed line segments 14 to define the lanes 12 of the multilane roadway 11 transitions to lane marking consisting of a solid line, for example. The positioning of the lane separators 18 is determined by the spacing of the entrances 16 to allow vehicles entering the roadway 11 to safely merge into through traffic while accommodating vehicles entering the roadway at a subsequent entrance 16 to merge onto the roadway after initially entering additional entrance/exit lanes 28. In instances where the entrances 16 are in close proximity to the exits 24, the number of merge lanes 20 is sufficient to allow entering and exiting vehicles to safely enter and exit the roadway 11 after first entering the additional entrance/exit lanes 28 with minimal effect on through traffic which is restricted to bypass lanes 22.

Figure 6:
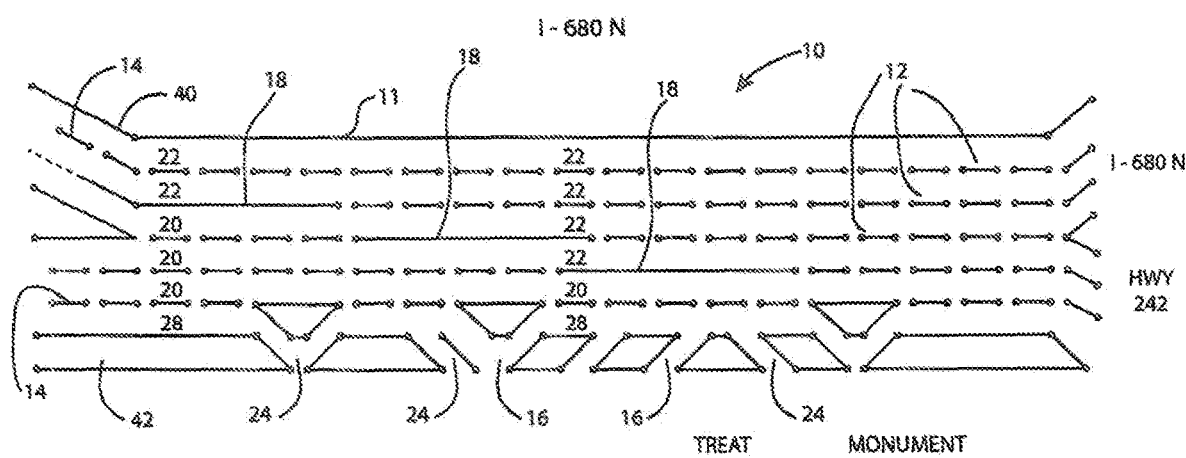
FIG. 6 is an elevational view of an example of a multilane roadway for management of vehicular traffic at one or more entrances and exits to a roadway proximate roadway junctions in accordance with the present invention.

Referring to FIG. 6, an example of the multilane roadway management system 10 is shown where the roadway 11 comprises a first multilane roadway 40 which merges with a second multilane roadway 42 and multiple entrances 16 and exits 24 are spaced along the roadway 42. As shown in FIG. 6, lane separators 18 having various lengths divide the roadways 40 and 42 into merge lanes 20 and bypass lanes 22 where the roadways 40 and 42 merge and in the vicinity of the entrances 16 and exits 24. The bypass lanes 22 begin where the conventional striping in the form of dashed line segments 14 to define the lanes 12 of the multilane roadways 40 and 42 transitions to lane marking consisting of a solid line, for example. The positioning of the lane separators 18 is determined by the merging of the multilane roadways 40 and 42 and spacing of the entrances 16 along the multilane roadway 42 to allow vehicles to merge from one of the multilane roadways 40 and 42 onto the other of the multilane roadways, while accommodating vehicles entering the multilane roadway 42 at entrances 16 to merge onto the roadways 40 and 42 after first entering additional entrance/exit lanes 28. In instances where the entrances 16 are in close proximity to the exits 24, the number of merge lanes 20 is sufficient to allow entering and exiting vehicles to safely enter and exit the multilane roadway 42 after entering the additional entrance/exit lanes 28 with minimal effect on through traffic which is restricted to bypass lanes 22.

Figure 7:
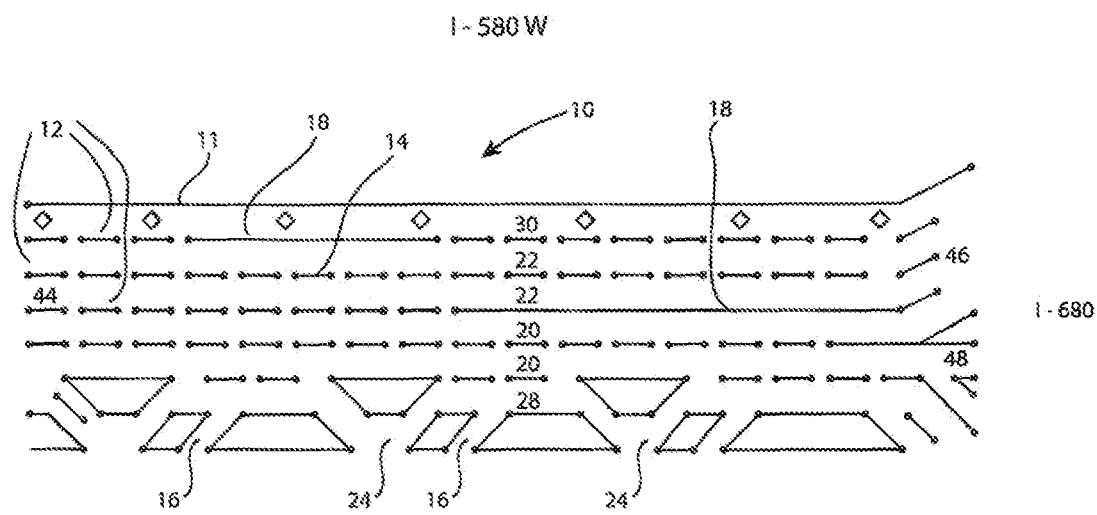
FIG. 7 is an elevational view of another example of a multilane roadway for management of vehicular traffic at one or more entrances and exits to a roadway proximate roadway junctions in accordance with the present invention.

Referring to FIG. 7, an example of the multilane roadway management system 10 is shown where the roadway 11 comprises a first multilane roadway 44 which splits into a second multilane roadway 46 and a third multilane roadway 48. Multiple entrances 16 and exits 24 are spaced along the multilane roadway 44, and a diamond lane 30 is also present. As shown in FIG. 7, lane separators 18 having various lengths divide the multilane roadway 44 into merge lanes 20 and bypass lanes 22 including the diamond lane 30 in the vicinity of the entrances 16 and exits 24. The bypass lanes 22 begin where the conventional striping in the form of dashed line segments 14 to define the lanes 12 of the multilane roadway 44 transitions to lane marking consisting of a solid line, for example. The positioning of the lane separators 18 is determined by the spacing of the entrances 16 to allow vehicles entering the multilane roadway 44 to safely merge into through traffic while accommodating vehicles entering the multilane roadway 44 at a subsequent entrance 16 to merge onto the multilane roadway after first entering an additional entrance/exit lane 28. In instances where the entrances 16 are in close proximity to exits 24, the number of merge lanes 20 is sufficient to allow entering and exiting vehicles to safely enter and exit the multilane roadway 44 after first entering the additional entrance/exit lane 28 with minimal effect on through traffic which is restricted to bypass lanes 22.

Figure 8:
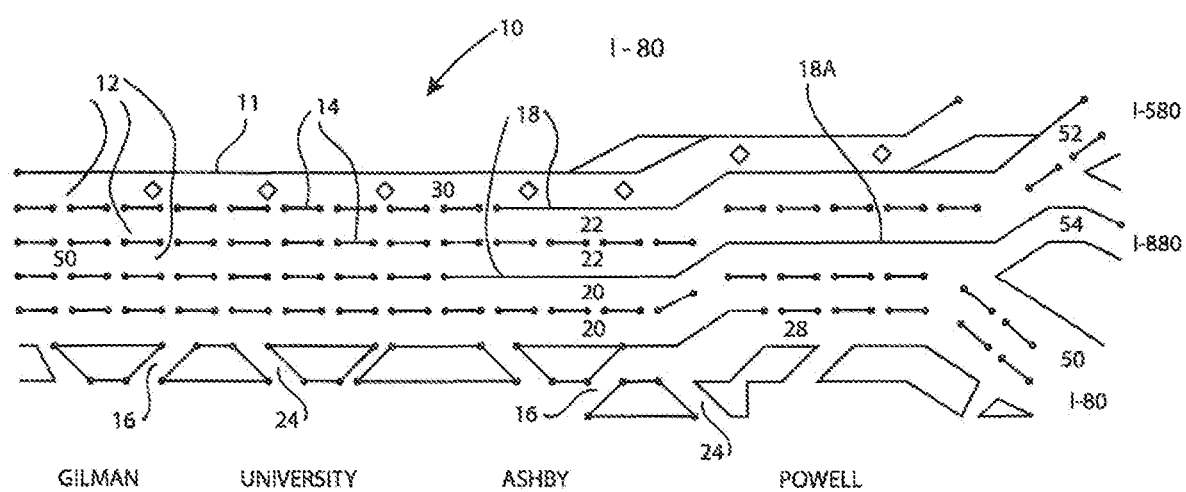
FIG. 8 is an elevational view of an additional example of a multilane roadway for management of vehicular traffic at one or more entrances and exits to a roadway proximate roadway junctions in accordance with the present invention.

Referring to FIG. 8, an example of the multilane roadway management system 10 is shown where the roadway 11 comprises a first multilane roadway 50 which splits into a second multilane roadway 52, a third multilane roadway 54, and a fourth multilane roadway 56. Multiple entrances 16 and exits 24 are spaced along the multilane roadway 50, and a diamond lane 30 is also present on roadway 50. As shown in FIG. 8, lane separators 18 having various lengths divide the multilane roadway 50 into merge lanes 20 and bypass lanes 22 including the diamond lane 30 in the vicinity of the entrances 16 and exits 24. The bypass lanes 22 begin where the conventional striping in the form of dashed line segments 14 to define the lanes 12 of the multilane roadway 50 transitions to lane marking consisting of a solid line, for example. The positioning of the lane separators 18 is determined by the spacing of the entrances 16 to allow vehicles entering the multilane roadway 50 to safely merge into through traffic while accommodating vehicles entering the multilane roadway 50 at a subsequent entrance 16 to merge onto the multilane roadway 50 after first entering an additional entrance/exit lane 28. In instances where the entrances 16 are in close proximity to the exits 24, the number of merge lanes 20 is sufficient to allow entering and exiting vehicles to safely enter and exit the multilane roadway 50 after entering the additional entrance/exit lane 28 with minimal effect on through traffic which is restricted to bypass lanes 22. As shown in FIG. 8, note that the lane separator 18A may promote safety by restricting vehicles from entering the multilane roadway 52 after initially merging onto the multilane roadway 50.

Referring to FIGS. 9A, 9B, and 9C, signage is preferably provided to alert motorists of approaching exits and related restrictions on lane changes imposed by lane separators 18 to reduce congestion by funneling through traffic into bypass lanes 22 and apprising motorists who want to exit to maneuver into merge lanes 20. As shown in FIG. 9A, signage may comprise a first sign 60 to alert motorists that they are approaching a bypass lane(s) for through traffic and the distance to the bypass lane(s). A second sign 62 may be existing signage informing motorists about exits which are upcoming and the distances to those exits, as well as the distance to an upcoming roadway junction.

As shown in FIG. 9B, signage may comprise a plurality of elements that are either separate signs or integrated into one sign. The signage may comprise a first element 64 to alert motorists that the are approaching a bypass lane(s) for through traffic and the distance to the bypass lane(s). A second element 66 may be signage informing motorists about local exits which are upcoming and the distances to those exits. A third element 68 may be signage informing motorists about a roadway junction which is upcoming and the distance to the roadway junction. Note that the distance to the bypass lane(s) is less than the distance to the local exits or the roadway junction, and therefore the signage respecting the bypass lane(s) appears at the top.

As shown in FIG. 9C, signage may comprise a plurality of elements that are either separate signs or integrated into one sign. The signage may comprise a first element 70 which may be signage informing motorists about local exits which are upcoming and the distances to those exits. A second element 72 may be signage informing motorists about a roadway junction which is upcoming and the distance to the roadway junction. A third element 72 may alert motorists that they are approaching a bypass lane(s) for through traffic and the distance to the bypass lane(s). Note that the distance to the bypass lane(s) appears at the bottom to give priority to the signage for the local exits and roadway junction.

The examples described above are provided by way of example only, and various modifications apparent to persons skilled in the art are contemplated. For example, as shown in FIG. 8, instead of striping, the lane separator 18A ma be a barrier installed between the lanes 12 of the roadway 11 which are vertically movable from a position with the top of the barrier flush with the surface of the roadway to a raised position extending above the surface of the roadway. Alternatively, as shown in FIG. 1, the lane separator 18A may be a moveable road zipper barrier commercially available from Lindsay Corporation located in Rio Vista, California.

Figure 10:
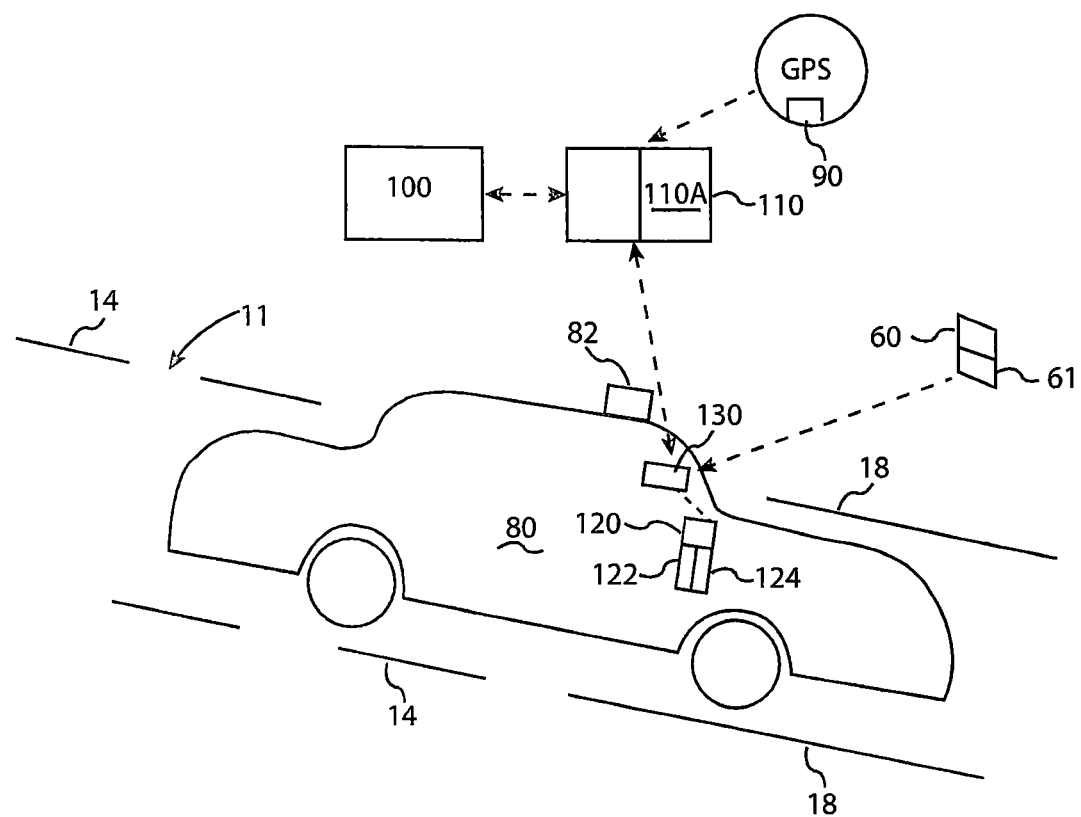
FIG. 10 illustrates an example of a system to acquire and store data for the positions of lane separators in accordance with the present invention.

Referring again to FIGS. 1-8, in accordance with one aspect of the present invention, data is acquired for the positions of the lane separators 18. By way of example, as shown in FIG. 10, the positions of the lane separators 18 may be acquired by an autonomous vehicle 80, such as by means of a camera(s) 82 mounted on the autonomous vehicle to obtain lane separator data, when the vehicle encounters a portion of the roadway 11 having lane separators. In accordance with another example of the present invention, data for the positions of the lane separators 18 may be acquired from images obtained by a Global Positioning System (GPS) satellite camera(s) 90. In accordance with yet another example of the present invention, data for the positions of the lane separators 18 may be provided by a transportation authority 100 which implements the lane separators.

In accordance with the examples, the data for the positions of the lane separators 18 are preferably stored in a database 110. The autonomous vehicle 80 is provided with access to the database 110 by means of a wireless modem 120 to download the data for the positions of the lane separators 18. The downloaded lane separator data is utilized by an autonomous in-vehicle computer 122 of the autonomous vehicle 80 to navigate the lane separators 18 based on the downloaded lane separator data as will be described below.

In one preferred example, after the positions of the lane separators 18 have been acquired, the data for the positions of the lane separators are stored in a lookup table 110A comprising the database 110. As shown in FIG. 9A, a transmitter 61 is preferably mounted on the signage 60 to transmit an identification code of the upcoming positions of the lane separators 18 as the autonomous vehicle 80 approaches the location where the lane separators are present. The autonomous vehicle 80 is equipped with a transponder 130 to receive the transmitted identification code and transmits the identification code to the lookup table 110A which is used to look up the positions of the lane separators 18 and download the data for the lane separators to the autonomous vehicle via the wireless modem 120. The autonomous vehicle 80 then utilizes the data for the lane separators 18 to navigate the upcoming lane separators. In accordance with a modification of the example of the present invention, the transponder 130 may be incorporated into the wireless modem 120.

Figure 11:
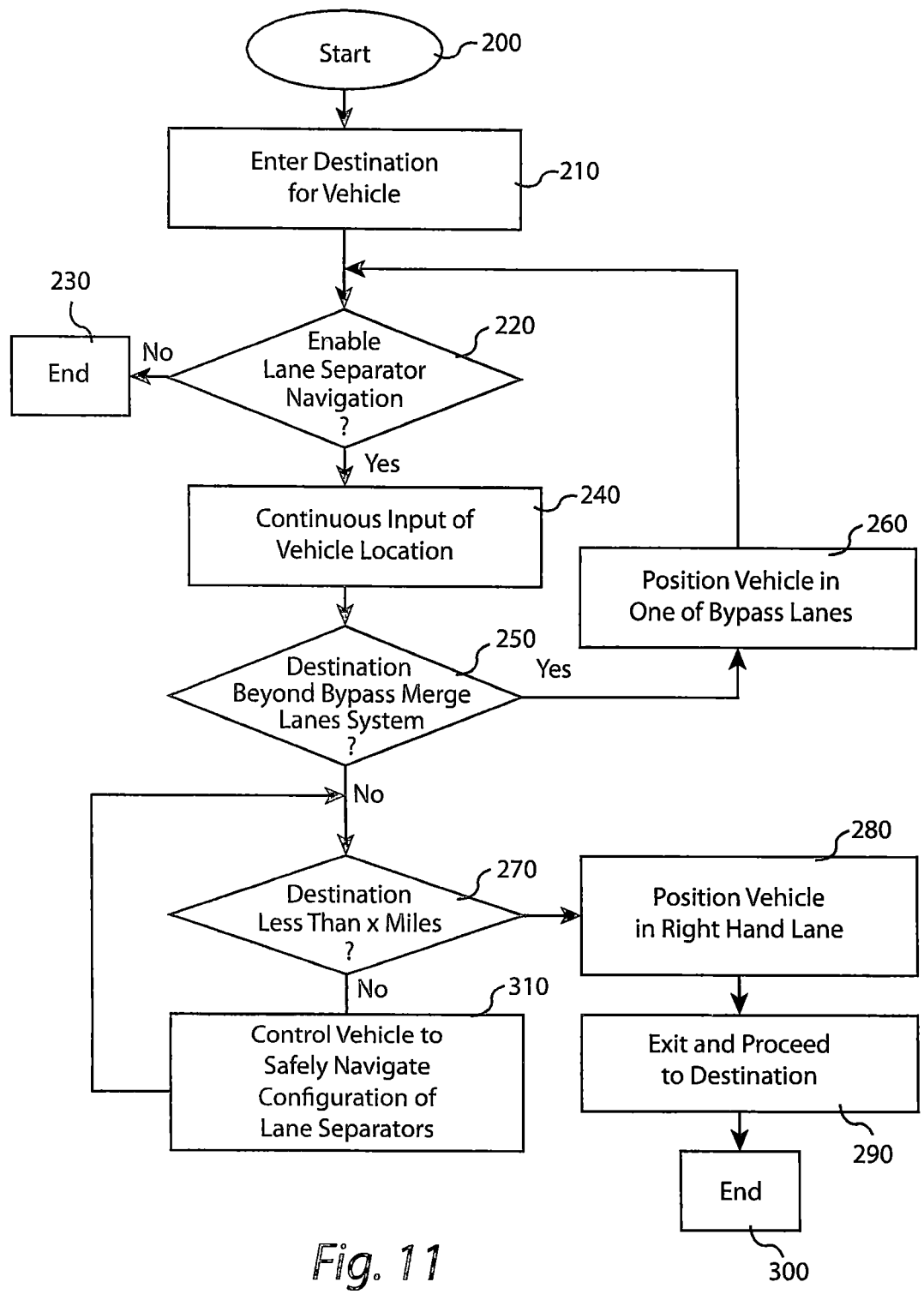
FIG. 11 illustrates a flow chart for navigating the positions of lane separators by an autonomous vehicle based on the data acquired for the positions of lane separators.

FIG. 11 illustrates a flow chart for the autonomous vehicle 80 navigating the positions of lane separators 18 based on the data acquired for the positions of lane separators. The autonomous in-vehicle computer 122 shown in FIG. 10 comprises a processor which is connected to program and data memory 124 to access instructions and data for navigating the positions of lane separators 18. For example, the autonomous in-vehicle computer 122 may be an ACO-3000-BRD-U in-vehicle computer commercially available from Premio located in City of Industry, California or an ABOX-5200 G-4 in-vehicle computer commercially available from Sintrones located in New Taipei City, Taiwan.

As shown in FIG. 11, the autonomous in-vehicle computer 122 shown in FIG. 10 is activated at step 200 when the autonomous vehicle 80 is placed in operation. Preferably, the instructions executed by the autonomous in-vehicle computer 122 for navigating the positions of lane separators 18 are instantiated when a destination for the autonomous vehicle 80 is entered, as indicated at step 210 shown in FIG. 11.

As indicated at step 220 in FIG. 11, the instructions executed by the autonomous in-vehicle computer 122 may selectively enable the instructions to continue, as indicated at step 220 shown in FIG. 11. For example, the transportation authority 100 may require that the lane separators 18 are in force only at certain times, for example, during rush hours. If not required, the instructions executed by the autonomous in-vehicle computer 122 end, as indicated at step 230.

If lane separators 18 are currently in force prior to reaching the entered destination, the instructions executed by the autonomous in-vehicle computer 122 continue and receive continuous input of the present location of the autonomous vehicle 80, as indicated at step 240 shown in FIG. 11. For example, the present location of the autonomous vehicle 80 may be obtained using conventional GPS data received by the autonomous in-vehicle computer 122 via the wireless modem 120.

As indicated at step 250 shown in FIG. 11, the instructions executed by the autonomous in-vehicle computer 122 preferably determine whether the destination entered at step 210 is beyond any intervening location where lane separators 18 are currently in force. If so, the instructions executed by the autonomous in-vehicle computer 122 control the autonomous vehicle 80 to be in one of the through lanes (i.e., one of the bypass lanes 22) to the entered destination, as indicated at step 260 and returns to step 220.

If the entered destination is less than or equal to a given distance x beyond the lane separators 18 currently in force as indicated at step 270 shown in FIG. 11, the instructions executed by the autonomous in-vehicle computer 122 control the position(s) the autonomous vehicle 80 to safely navigate into one of the right hand lanes to proceed to exit, as indicated at step 280 in FIG. 11. The autonomous vehicle 80 then exits and proceeds to the entered destination and the instructions executed by the autonomous in-vehicle computer 122 end, as indicated at steps 290 and 300 shown in FIG. 11, respectively.

If, on the other hand, the entered destination is greater than the given distance x as indicated at step 270, the instructions executed by the autonomous in-vehicle computer 122 control the position(s) the autonomous vehicle 80 to navigate the vehicle to safely proceed toward the entered destination, as indicated at step 310 and then returns to step 270 as shown in FIG. 11.

The example described in FIG. 11 is provided by way of example only, and various modifications apparent to persons skilled in the art are contemplated.

What is claimed is:

1. A system to manage vehicular traffic on a roadway having multiple through lanes of vehicular traffic moving in the same direction to reduce congestion in the vicinity of an entrance enabling vehicles to enter the roadway, the roadway not having a High Occupancy Vehicle (HOV) or Express Lane in the vicinity of the entrance, comprising in combination:
   a roadway comprising a plurality of m through lanes of vehicular traffic moving in the same direction in the vicinity of an entrance to the roadway where m is an integer and m>2, wherein the m through lanes are delineated by dashed line segments having a given length between the lanes; and
   a system comprising a plurality of lane separators positioned between n of the m through lanes where n is an integer and 2≤n≤m, which should not be crossed by vehicular traffic along a designated portion of the roadway within a predetermined distance d from the entrance to the roadway;
   wherein the plurality of lane separators differ from dashed line segments delineating the m through lanes, the lane separators having a plurality of diverse predetermined lengths different from the given length and being located at predetermined positions with respect to the m through lanes to indicate that vehicular traffic should not cross any lane separator from one lane of the m through lanes in which the vehicular traffic is within the predetermined distance d from the entrance to an adjacent lane where one of the lane separators is positioned between the one lane and the adjacent lane;
   wherein the plurality of lane separators define at least one of the m through lanes as an entrance bypass lane distal to the entrance to the roadway and at least one of the m through lanes as a merge lane proximal to the entrance to the roadway to enable vehicles to merge at the entrance into the at least one merge lane; and
   wherein the plurality of lane separators are located amongst the m through lanes to manage entry of vehicles into the at least one merge lane at the entrance to the roadway; the combination further comprising:
   an autonomous vehicle to navigate the roadway, the autonomous vehicle comprising:
   an in-vehicle computer to execute instructions responsive to lane separator data to control the position of the autonomous vehicle to navigate the lane separators such that the autonomous vehicle does not cross any lane separator from one lane of the m through lanes in which the autonomous vehicle is within the predetermined distance d from the entrance to an adjacent lane where one of the lane separators is positioned between the one lane and the adjacent lane.

2. The system as recited in claim 1 wherein the plurality of lane separators are in the form of solid lines of striping.

3. The system as recited in claim 1 wherein the plurality of lane separators comprise at least one barrier that is vertically movable from a position with a top of the at least one barrier flush with a surface of the roadway to a raised position extending above the surface of the roadway.

4. The system as recited in claim 1 wherein the plurality of lane separators comprise at least one moveable road zipper barrier.

5. The system as recited in claim 1, further comprising an additional entrance lane adjacent to the at least one merge lane.

6. The system of claim 1 wherein the autonomous vehicle further comprises at least one camera to acquire the lane separator data.

7. The system of claim 1 wherein the lane separator data is obtained based on a satellite image.

8. The system of claim 1 wherein the lane separation data is provided by a transportation authority.

9. The system as recited in claim 1, further comprising signage to alert motorists that they are approaching the at least one entrance bypass lane for through traffic and a distance to the at least one entrance bypass lane.

10. The system as recited in claim 9, further comprising a transmitter mounted on the signage to transmit an identification code to the autonomous vehicle, and the autonomous vehicle further comprises a transponder to receive the identification code and transmit the identification code to a lookup table, and the lookup table transmits the lane separator data to the autonomous vehicle.

11. A system to manage vehicular traffic on a roadway having multiple through lanes of vehicular traffic moving in the same direction to reduce congestion in the vicinity of an entrance enabling vehicles to enter the roadway, the roadway having at least one High Occupancy Vehicle (HOV) or Express Lane in the vicinity of the entrance and additionally having a plurality of m through lanes of vehicular traffic moving in the same direction as the traffic moving in the at least one HOV or Express Lane in the vicinity of the entrance to the roadway where m is an integer and m>2, wherein the m through lanes are delineated by dashed line segments having a given length between the lanes, the improvement comprising in combination:
   a system comprising a plurality of lane separators positioned between n of the m through lanes where n is an integer and 2≤n≤m, which should not be crossed by vehicular traffic along a designated portion of the roadway within a predetermined distance d from the entrance to the roadway;
   wherein the plurality of lane separators differ from dashed line segments delineating the m through lanes, the lane separators having a plurality of diverse predetermined lengths different from the given length and being located at predetermined positions with respect to the m through lanes to indicate that vehicular traffic should not cross any lane separator from one lane of the m through lanes in which the vehicular traffic is within the predetermined distance d from the entrance to an adjacent lane where one of the lane separators is positioned between the one lane and the adjacent lane;
   wherein the plurality of lane separators define at least one of the m through lanes as an entrance bypass lane distal to the entrance to the roadway and at least one of the m through lanes as a merge lane proximal to the entrance to the roadway to enable vehicles to merge at the entrance into the at least one merge lane; and wherein the plurality of lane separators are located amongst the m through lanes to manage entry of vehicles into the at least one merge lane at the entrance to the roadway; and the combination further comprising:

an autonomous vehicle to navigate the roadway, the autonomous vehicle comprising:

an in-vehicle computer to execute instructions responsive to lane separator data to control the position of the autonomous vehicle to navigate the lane separators such that the autonomous vehicle does not cross any lane separator from one lane of the m through lanes in which the autonomous vehicle is within the predetermined distance d from the entrance to an adjacent lane where one of the lane separators is positioned between the one lane and the adjacent lane.

12. The system as recited in claim 11 wherein the plurality of lane separators are in the form of solid lines of striping.

13. The system as recited in claim 11 wherein the plurality of lane separators comprise at least one barrier that is vertically movable from as position with a top of the at least one barrier flush with a surface of the roadway to a raised position extending above the surface of the roadway.

14. The system as recited in claim 11 wherein the plurality of lane separators comprise at least one moveable road zipper barrier.

15. The system as recited in claim 11, further comprising an additional entrance lane adjacent to the at least one merge lane.

16. The system of claim 11 wherein the autonomous vehicle further comprises at least one camera to acquire the lane separator data.

17. The system of claim 11 wherein the lane separator data is obtained based on a satellite image.

18. The system of claim 11 wherein the lane separation data is provided by a transportation authority.

19. The system as recited in claim 11, further comprising signage to alert motorists that they are approaching the at least one entrance bypass lane for through traffic and a distance to the at least one entrance bypass lane.

20. The system as recited in claim 19, further comprising a transmitter mounted on the signage to transmit an identification code to the autonomous vehicle, and the autonomous vehicle further comprises a transponder to receive the identification code and transmit the identification code to a lookup table, and the lookup table transmits the lane separator data to the autonomous vehicle.

* * * * *